March 11, 1924. 1,486,251
G. KNIGHT
VALVE
Filed Dec. 31, 1921
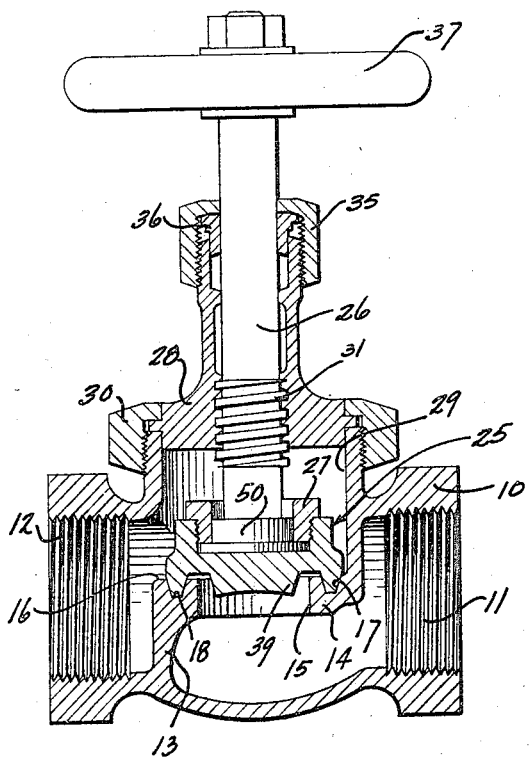
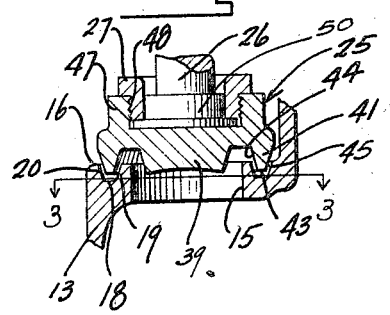
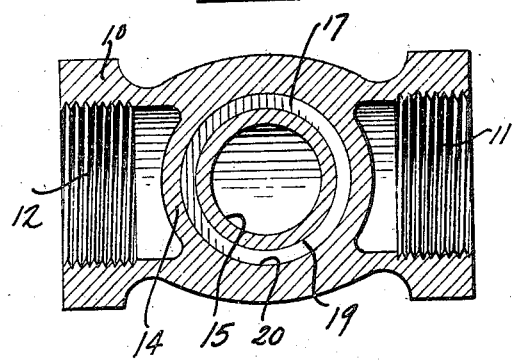
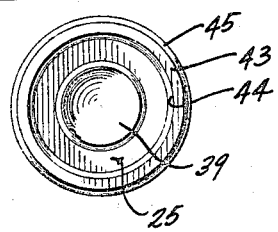
George Knight.
Inventor Patented Mar. 11, 1924.

1,486,251

UNITED STATES PATENT OFFICE.

GEORGE KNIGHT, OF STERLING, COLORADO.

VALVE.

Application filed December 31, 1921. Serial No. 526,136.

*To all whom it may concern:*

Be it known that I, GEORGE KNIGHT, a citizen of the United States, residing at Sterling, in the county of Logan and State of Colorado, have invented certain new and useful Improvements in Valves, of which the following is a specification.

This invention relates to improvements in valves for regulating flow of steams or liquids under pressure.

The primary object of the invention is the provision of an improved valve seating arrangement specifically adapted for use in connection with globe valves.

A further object of the invention is the provision of a valve member and a seat therefor, which are so cooperatively designed as to provide a novel, accurate, and positive sealing connection when the valve member is disposed upon the seat.

A further object of the invention is the provision of a valve arrangement of the above described character, in which a valve member so cooperates with the structure of its seat as to provide a relatively great seating surface area, with which the valve member is in intimate contact when the valve is closed; the valve member being so formed as to provide a novel reinforcement for the valve seat to prevent lateral distortion of the same incident to contraction or expansion of the valve, during the various uses to which the same may be subjected.

Other objects and advantages will be apparent during the course of the following detailed description.

In the accompanying drawing, forming a part of this specification, and wherein similar reference characters designate corresponding parts throughout the several views.

Figure 1 is a vertical cross sectional view taken through a globe valve structure and showing the improved valve seating arrangement therein.

Figure 2 is a fragmentary cross sectional view of the improved valve seating arrangement and showing the same in different adjusted position from that shown in Figure 1.

Figure 3 is a vertical cross sectional view taken on the line 3—3 of Figure 2, and showing the valve seat structure.

Figure 4 is a bottom plan view of the valve disc member and its improved formation.

In the drawing, wherein for the purpose of illustration is shown the preferred embodiment of this invention; the numeral 10 designates the valve body portion having the openings 11 and 12 therein for entrance and exit respectively of gases or liquids. The valve body 10 may, of course, be of any design, and preferably has a web shaped partition 13 therein providing the horizontal valve seat 14, in which the opening 15 is provided for passage of substances from the inlet opening 11 on their way to the exit opening 12. The seat 14 may be of any material and is preferably formed of some hard metal, such as a nickel or alloy, from which valve seats are ordinarily constructed. The upper surface 16 of the valve seat 14 is provided with a groove 17 which is formed in annular manner concentric with the passageway 15. The groove 17 is of construction which is of prime importance, and includes the bottom surface 18, which is relatively flat; the inside and outer sides 19 and 20 of said groove 17 diverging upwardly from said bottom 18. Thus the groove 17 is substantially V-shaped in formation, the inclination and height of the sides 19 and 20 being substantially the same.

In case the valve seating arrangement is constructed in a globe valve, the disc valve member 25 is provided on the lower end of the adjusting valve stem 26 being retained thereon as by a detachable nut 27. The cap 28 is detachably maintained over the adjusting opening 29 in the body 10 as by the nut 30; said stem 26 having certain screw threads 31 thereon for engaging in a threaded portion of the cap 28, and whereby the stem 26 may be advanced or retracted with respect to the seat 14. An ordinary packing nut 35, including a following gland 36, may be mounted upon the upper end of the cap 28 and about the stem 26, for providing a leak proof connection. An ordinary hand wheel 37 may be mounted upon the upper exterior end of the stem 26 for manual rotation thereof.

The disc valve member 25 is of novel construction and includes a frusto conical depending portion 39 formed axially thereon, which is adapted for suspending over or in the passageway 15 when said valve member 25 is mounted upon the stem 26. The lower surface of the valve member 25, is furthermore, provided with an annular extension 41 preferably formed concentric with the axes of the stem 26 and projection 39. This extension 41 is adapted for cooperation in the annular groove 17, and to this end comprises the flat annular bottom surface 43 having the inner and outer sides 44 and 45 diverging upwardly from the bottom surface 43. Thus, the annular extension 41 in effect, forms a tongue which is substantially V-shaped in cross section. The valve member 25 is provided with an upwardly extending attaching flange 47 which bears a certain relation to the depending extension 41, in that the same is directly over this extension 41 for substantially one half of the width of the V-shaped extension 41, and thus providing proper reinforcement. The interior of the attaching flange 47 is screw threaded, as at 48, and whereby the nut 27 may be attached therein for mounting the valve member 25 in proper manner upon the enlarged head 50, ordinarily found upon the lower end of a globe valve stem 26.

In operation, it is obvious that when the valve member 25 is raised off of the seat 14, the liquid or gas will be permitted to flow through the body 10 as in ordinary globe valve manner. However, as the valve member 25 is fed by the adjusting stem 26 toward the seat 14, the depending annular extension 41 will enter the pocket formed by the annular groove 17, as is illustrated in Figure 2. The gas or liquid will be baffled to a considerable extent during its flow through the pocket groove 17 when the extension 41 is in the position illustrated in Figure 2. When the valve member 25 is seated upon the horizontal seat 14 to close the valve structure, the bottom and side surfaces of the extension tongue 41 will engage in intimate contact with the bottom and side surfaces of the groove 17. This manner of valve seating is novel, since heretofore it has been the practice to provide the valve members with only one seating surface with respect to the valve seat. It is a matter of common knowledge, that globe valve seats are subjected to such pressures as to occasionally distort the seat so that the valve member will not fit tightly thereon. However, it is obvious that in the case of the tongue and groove joint provided in the improved structure herein shown, the pressure forces will be directly transmitted into the valve member structure 25, and will not leave the full force of the pressure to be borne by the web partition 13 and the seat 14.

Due to the various uses of globe valves, and to the variations in temperature in which the same are to be used, the valve seat 14 will be subject to contraction and expansion. Both contraction and expansion are substantially insured against, in the seat 14, by reason of the fact that the interior and exterior sides of the annular extensions 41 are in direct and intimate contact with the interior and exterior surfaces respectively of the groove 17, when the valve member 25 is seated upon the seat 14. Thus, it can be seen that when the tendency of the seat 14 is toward contraction, the same will be laterally reinforced, by reason of the fact that the side 20 engages the outer side 45 of the annular extension 41. On the other hand, lateral expansion of the seat 14 is insured against by reason of the intimate contact of the inner surface 19 of the groove 17 with the inner surface 44 of the annular extension 41.

The member 25 and the seat 14 may both be made of the same material, in order that contraction and expansion will be relatively compensated for in both of these elements.

From the foregoing, it can be seen that the improved valve seating arrangement is of great utility in that the tongue and groove sealing joint not only laterally reinforces the seat to preserve the life of the globe valve, but provides such broad surface contact as to positively insure against a leaking connection.

Various changes in the shape, size and arrangement of parts may be made to the form of the invention herein shown and described, without departing from the spirit of the invention or the scope of the claim.

I claim:

A valve, comprising a body, a web partition mounted in said body including a horizontal seat provided with a passageway opening therein and having an annular groove concentric about said opening and upon the upper surface of said horizontal seat, said groove having a flat bottom surface and provided with upwardly extending diverging sides, a disc valve member of substantially the same material as said seat and including a depending annular extension providing a bottom surface and having upwardly diverging sides, and adjustable means mounting said valve disc member in said body for cooperation with said horizontal seat, and whereby the annular extension of said valve member may have the bottom surface and sides thereof in intimate contact with the bottom surface and sides of the groove in said seat, when said valve is closed.

GEORGE KNIGHT.